April 13, 1926. 1,580,260

A. G. KLINE

ENDLESS FLEXIBLE TRACK FOR AUTOMOBILE WHEELS

Filed June 5, 1924

INVENTOR.
August G. Kline
BY
ATTORNEY.

Patented Apr. 13, 1926.

1,580,260

UNITED STATES PATENT OFFICE.

AUGUST G. KLINE, OF ROYAL OAK TOWNSHIP, OAKLAND COUNTY, MICHIGAN.

ENDLESS FLEXIBLE TRACK FOR AUTOMOBILE WHEELS.

Application filed June 5, 1924. Serial No. 717,971.

*To all whom it may concern:*

Be it known that I, AUGUST G. KLINE, a citizen of the United States, and residing at Royal Oak Township, in the county of Oakland and State of Michigan, have invented a new and Improved Endless Flexible Track for Automobile Wheels, of which the following is a specification.

This invention relates to endless flexible tracks for automobile wheels and is particularly adapted for use in connection with the driving wheels of an automobile.

One of the objects of the invention is to provide a device for use when driving in heavy mud or sand and also adapted for use in pulling an automobile out of a mud hole.

Another object of the invention is to provide an endless flexible track of greater diameter than the wheel with which it is used, the slack in the track being automatically taken up in order to hold the track in contact with the surface of the driving wheel.

A further object of the invention is to provide a spring supported pulley secured to the automobile fender and adapted to maintain the track under tension and in tight engagement with the automobile wheel so that the automobile wheel in effect lays its own track.

Another object of the invention is to provide an endless flexible track provided with cleats for engaging the road surface and adapted to grip the road to allow the automobile to be driven thereover.

These objects and the several novel features of the invention are hereinafter more fully described and claimed and the preferred form of construction by which these objects are attained is shown in the accompanying drawings in which—

Figure 1:
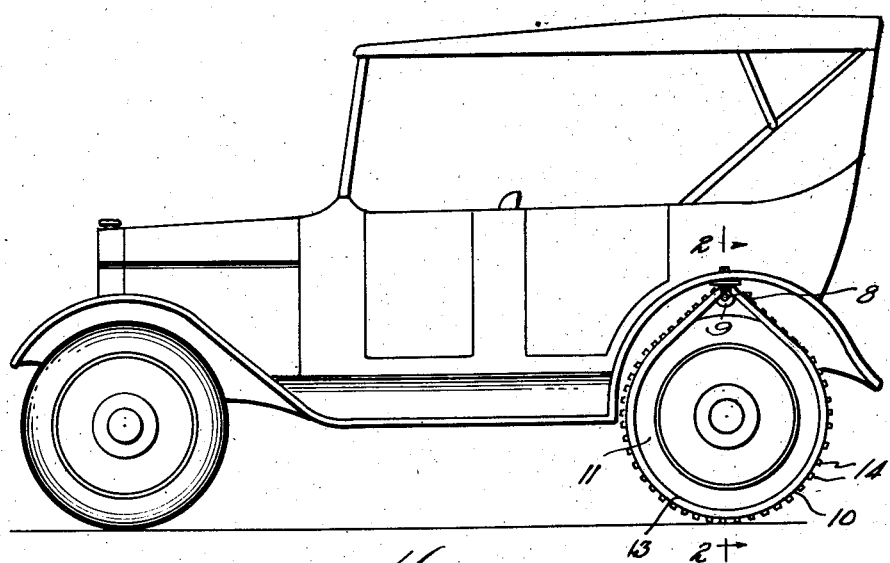
Fig. 1 is an elevation of an automobile showing the wheel with the endless flexible belt track applied thereto.
Figure 4:
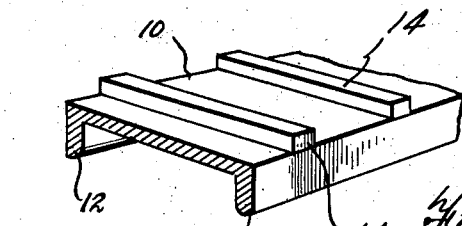
Fig. 4 is a perspective view of a portion of the track.
Figure 3:
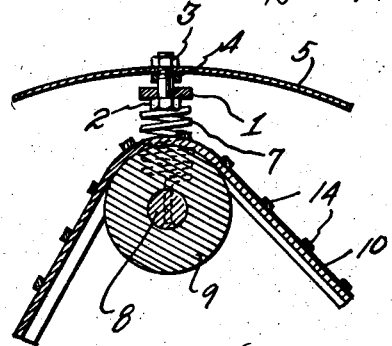
Fig. 3 is an enlarged section taken on line 3—3 of Fig. 2.
Figure 2:
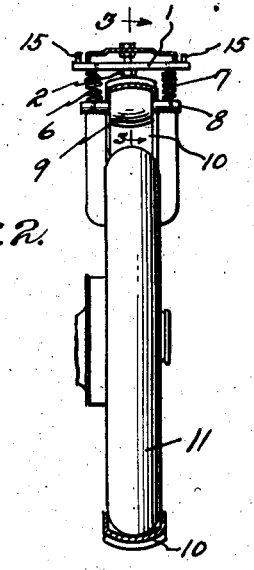
Fig. 2 is a section through the pulley and belt taken on line 2—2 of Fig. 1 and showing the wheel in elevation.

The device comprises a plate 1 shown in Figs. 2 and 3 through which a bolt 2 extends the bolt 2 being provided with nuts 3 and 4 adapted to clamp the automobile fender 5 therebetween which is apertured to receive the bolt 2. A pair of springs 6 and 7 are secured to the member 1 and at the lower end are secured to the shaft 8 on which a pulley 9 is rotatably mounted. This pulley is preferably provided with a curved face as shown in Fig. 2 and a belt 10 extends over the pulley 9 and about the tire 11 as shown in Fig. 1. This belt 10 may be made of leather or fabric and rubber or rubber composition or other suitable material and may be provided with a flat face riding in contact with the pulley and tire or may be provided with peripheral flanges 12 and 13 as shown in Fig. 4 to prevent the belt from coming off the tire and pulley. The outer surface of the belt is preferably provided with cleats 14 which provide traction and the belt is preferably made of flexible material to adapt itself to the contour of the tire.

The automobile rear fenders are each provided with an aperture for the bolts 2 and when it is desired to use the device the belt is positioned around the automobile tire as shown in Fig. 1 and the bolts 2 are secured in the apertures provided therefor in the automobile fenders. The member 1 extending across the fender is provided with upwardly extending lugs 15 which allow the plate 1 to turn slightly on the bolt 2 but limit this movement upon engagement with the edge of the fender. When the device is attached to the tire as shown in Figs. 1 and 2 the tire in rotating carries the flexible track with it and in effect lays the track for the tire as it rotates. By means of the flanges 12 and 13 the track is held on the tire and on the pulley and the springs 6 and 7 take up the slack in the track.

Figure 5:
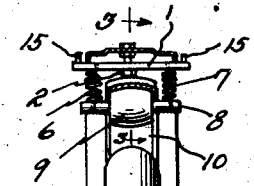
Fig. 5 is a section of a belt showing a reinforcing member embedded therein.

By means of the cleats 14 the automobile is prevented from skidding and provides a cushion between the tire and the road surface which increases the riding comfort of the passengers of the automobile. This device will prevent skidding on a slippery road and will provide a grip for the wheels in mud and heavy sand. This device will also save the tire from glass, tacks or from wear on the road surface and by providing a grip on the road surface prevents grinding of the tires. By means utilized in securing the device to the fender the pulley may move vertically or pivot to some extent depending upon the movement of the flexible track. As shown in Fig. 5, the track may be provided with chains embedded therein to strengthen the track and prevent possibility of the track pulling apart or stretching while in use.

From the foregoing description it becomes evident that the device is very simple and efficient in operation, will not easily get out of order, may be easily attached to or removed from the wheels and provides a device which accomplishes the objects described.

Having thus fully described my invention, its utility and mode of operation, what I claim and desire to secure by Letters Patent of the United States is—

1. A traction device for automobiles comprising a plate adapted to be attached to the automobile fender, a pair of springs depending from the said plate, a shaft secured to the lower end of the springs, a pulley rotatably mounted on the shaft, and an endless flexible track extending about the automobile tire and pulley.

2. A traction device for automobiles comprising an endless flexible track adapted to be positioned about the driving wheel of an automobile, a pulley adapted to be attached to the automobile fender over the wheel, the track extending over the pulley, and a pair of springs from which the pulley is supported and adapted to maintain a tension on the track.

3. A traction device for automobiles comprising an endless flexible track adapted to be positioned on the periphery of an automobile tire, and a pulley over which the track extends, the pulley being spring supported from the automobile fender and being adapted to pivot thereon.

4. A traction device for automobiles comprising an endless flexible track adapted to be positioned about the driving wheel of an automobile, a pulley spring supported from the automobile fender over which the flexible track is adapted to ride, the spring supported pulley maintaining a tension on the track to hold it on the wheel.

In testimony whereof I sign this specification.

AUGUST G. KLINE.